United States Patent
Kuster et al.

(10) Patent No.: US 9,684,953 B2
(45) Date of Patent: Jun. 20, 2017

(54) METHOD AND SYSTEM FOR IMAGE PROCESSING IN VIDEO CONFERENCING

(71) Applicants: ETH Zürich, Zürich ETH-Zentrum (CH); The Technion Research and Development Foundation Ltd., Haifa (IL)

(72) Inventors: Claudia Kuster, Zürich (CH); Tiberiu Popa, Zürich (CH); Jean-Charles Bazin, Zürich (CH); Markus Gross, Zürich (CH); Craig Gotsman, Zürich (CH)

(73) Assignees: ETH Zurich, Zürich ETH-Zentrum (CH); The Technion Research and Development Foundation Ltd., Haifa (IL)

( * ) Notice: Subject to any disclaimer, the term of this patent is extended or adjusted under 35 U.S.C. 154(b) by 0 days.

(21) Appl. No.: 14/380,450

(22) PCT Filed: Nov. 13, 2012

(86) PCT No.: PCT/EP2012/004710
§ 371 (c)(1),
(2) Date: Aug. 22, 2014

(87) PCT Pub. No.: WO2013/127418
PCT Pub. Date: Sep. 6, 2013

(65) Prior Publication Data
US 2015/0009277 A1    Jan. 8, 2015

(30) Foreign Application Priority Data

Feb. 27, 2012    (EP) .................................... 12001264

(51) Int. Cl.
*H04N 7/14* (2006.01)
*G06T 5/50* (2006.01)
(Continued)

(52) U.S. Cl.
CPC .................. *G06T 5/50* (2013.01); *G06T 7/73* (2017.01); *G06T 15/205* (2013.01); *G06T 17/00* (2013.01);
(Continued)

(58) Field of Classification Search
USPC ............................................. 348/14.01–14.09
See application file for complete search history.

(56) References Cited

U.S. PATENT DOCUMENTS

| 5,500,671 A | 3/1996 | Andersson et al. |
| 8,428,315 B2 * | 4/2013 | Suetens ................... G06T 19/20 382/128 |

(Continued)

FOREIGN PATENT DOCUMENTS

| EP | 2150065 A2 | 2/2010 |
| JP | H06090445 A | 3/1994 |

(Continued)

OTHER PUBLICATIONS

Seitz S M et al.: "View Morphing", Computer Graphics Proceedings 1996 (SIGGRAPH), New Orleans, Aug. 4-9, 1996; (SIGGRAPH), New York, NY: ACM, US, Aug. 4, 1996 (Aug. 4, 1996), pp. 21-30, XP000682718.

(Continued)

*Primary Examiner* — Maria El-Zoobi
(74) *Attorney, Agent, or Firm* — Terrence M. Wyles, Esq.; Startup IP Law, LLC

(57) ABSTRACT

A method for image processing in video conferencing, for correcting the gaze of an interlocutor in an image or a sequence of images captured by at least one real camera, comprises the steps of
the at least one real camera acquiring an original image of the interlocutor;

(Continued)

synthesizing a corrected view of the interlocutor's face as seen by a virtual camera, the virtual camera being located on the interlocutor's line of sight and oriented towards the interlocutor;

transferring the corrected view of the interlocutor's face from the synthesized view into the original image, thereby generating a final image;

at least one of displaying the final image and transmitting the final image.

19 Claims, 3 Drawing Sheets

(51) Int. Cl.
    *G06T 15/20*     (2011.01)
    *H04N 7/15*     (2006.01)
    *G06T 17/00*     (2006.01)
    *G06T 7/73*     (2017.01)

(52) U.S. Cl.
    CPC ............ *H04N 7/141* (2013.01); *H04N 7/142* (2013.01); *H04N 7/15* (2013.01); *G06T 2200/04* (2013.01); *G06T 2207/10016* (2013.01); *G06T 2207/10028* (2013.01); *G06T 2207/20212* (2013.01); *G06T 2207/30201* (2013.01)

(56) References Cited

U.S. PATENT DOCUMENTS

| | | | | |
|---|---|---|---|---|
| 2002/0186216 | A1* | 12/2002 | Baumberg | G06T 17/10 345/422 |
| 2003/0152288 | A1* | 8/2003 | Balmelli | G06T 15/04 382/276 |
| 2003/0197779 | A1 | 10/2003 | Zhang et al. | |
| 2006/0017804 | A1 | 1/2006 | Lee et al. | |
| 2011/0267348 | A1* | 11/2011 | Lin | G06T 15/205 345/426 |
| 2014/0362170 | A1* | 12/2014 | Walker | H04N 19/105 348/14.08 |

FOREIGN PATENT DOCUMENTS

| | | |
|---|---|---|
| JP | H08237629 A | 9/1996 |
| WO | 2011117776 A | 9/2011 |

OTHER PUBLICATIONS

Dong Tian et al.: "View synthesis techniques for 3D video", Applications of Digital Image Processing XXXII, Sep. 2, 2009 (Sep. 2, 2009), p. 74430T, XP055041884, San Diego, CA; DOI: 10.1117/12.829372 (Also available via Proc. SPIE. 7443, Applications of Digital Image Processing XXXII, 74430T. (Aug. 20, 2009) doi: 10.1117/12.829372).

Wolfgang Waizenegger et al.: "Patch-sweeping with robust prior for high precision depth estimation in real-time systems", Image Processing (ICIP), 2011 18th IEEE International Conference on, IEEE, Sep. 11, 2011 (Sep. 11, 2011), pp. 881-884, XP032080635; DOI: 10.1109/ICIP.2011.6116699; ISBN: 978-1-4577-1304-0.

International Search Report for PCT/EP2012/004710 from the EPO, mailed on Apr. 29, 2013 (six pages).

Tsuyoshi Yamaguchi et al.; Generating Facial Image Eye-contacting with Partner on the TV Conference Environment through Iris Recognition by Hough Transform; Japan; The Institute of Electronics, Information and Communication Engineers; Nov. 19, 1999; vol. 99, No. 449, p. 21-28; ISSN 0913-5685 (10 pages, with English Abstract).

Jan. 12, 2017 Office-Action report (three pages) from Fukami Patent Office P.C. containing and English-language summary of an Office Action issued against Japanese Patent Application No. 2014-558005, which is the Japanese National-Phase Entry from PCT/EP2012/004710.

* cited by examiner

METHOD AND SYSTEM FOR IMAGE PROCESSING IN VIDEO CONFERENCING

CROSS-REFERENCE TO RELATED APPLICATIONS

The present patent application claims the priority benefit of Patent Cooperation Treaty (PCT) Application No. PCT/EP2012/004710, filed on Nov. 13, 2012 for "Method and System for Imaging Processing in Video Conferencing", and also claims the priority benefit of European Patent Application EP 12001264.6, filed on Feb. 27, 2012 for "Method and System for Imaging Processing in Video Conferencing". In addition, both applications, PCT/EP2012/004710 and EP 12001264.6 are hereby incorporated by reference in their entirety for all purposes.

BACKGROUND

The invention relates to the field of video image processing, and in particular to a method and system for image processing in video conferencing as described in the preamble of the corresponding independent claims.

Effective communication using current video conferencing systems is severely hindered by the lack of eye contact caused by the disparity between the locations of the subject and the camera. While this problem has been partially solved for high-end expensive video conferencing systems, it has not been convincingly solved for consumer-level setups.

It has been firmly established [Argyle and Cook 1976; Chen 2002; Macrae et al. 2002] that mutual gaze awareness (i.e., eye contact) is a critical aspect of human communication, both in person or over an electronic link such as a video conferencing system [Grayson and Monk 2003; Mukawa et al. 2005; Monk and Gale 2002]. Thus, in order to realistically imitate real-world communication patterns in virtual communication, it is critical that the eye contact is preserved. Unfortunately, conventional hardware setups for consumer video conferencing inherently prevent this. During a session we tend to look at the face of the person talking, rendered in a window within the display, and not at the camera, typically located at the top or bottom of the screen. Therefore, it is not possible to make eye contact. People who use consumer video conferencing systems, such as Skype, experience this problem frequently. They constantly have the illusion that their conversation partner is looking somewhere above or below them. The lack of eye contact makes communication awkward and unnatural. This problem has been around since the dawn of video conferencing [Stokes 1969] and has not yet been convincingly addressed for consumer-level systems.

While full gaze awareness is a complex psychological phenomenon [Chen 2002; Argyle and Cook 1976], mutual gaze or eye contact has a simple geometric description: the subjects making eye contact must be in the center of their mutual line of sight [Monk and Gale 2002]. Using this simplified model, the gaze problem can be cast as a novel view synthesis problem: render the scene from a virtual camera placed along the line of sight [Chen 2002]. One way to do this is through the use of custom-made hardware setups that change the position of the camera using a system of mirrors [Okada et al. 1994; Ishii and Kobayashi 1992]. These setups are usually too expensive for a consumer-level system.

The alternative is to use software algorithms to synthesize an image from a novel viewpoint different from that of the real camera. Systems that can convincingly do novel view synthesis typically consist of multiple camera setups [Matusik et al. 2000; Matusik and Pfister 2004; Zitnick et al. 2004; Petit et al. 2010; Kuster et al. 2011] and proceed in two stages. In the first stage they reconstruct the geometry of the scene and in the second stage, render the geometry from the novel viewpoint. These methods require a number of cameras too large to be practical or affordable for a typical consumer. They have a convoluted setup and are difficult to run in real-time.

With the emergence of consumer-level depth and color cameras such as the Kinect [Microsoft 2010] it is possible to acquire in real-time both color and geometry. This can greatly facilitate solutions to the novel view synthesis problem, as demonstrated by Kuster et al. [2011]. Since already over 15 million Kinect devices have been sold, technology experts predict that soon the depth/color hybrid cameras will be as ubiquitous as webcams and in a few years will even be available on mobile devices. Given the recent overwhelming popularity of such hybrid sensors, we propose a setup consisting of only one such device. At first glance the solution seems obvious: if the geometry and the appearance of the objects in the scene are known, then all that needs to be done is to render this 3D scene from the correct novel viewpoint. However, some fundamental challenges and limitations should be noted:

The available geometry is limited to a depth map from a single viewpoint. As such, it is very sensitive to occlusions, and synthesizing the scene from an arbitrary (novel) viewpoint may result in many holes due to the lack of both color and depth information, as illustrated in FIG. 2 (left). It might be possible to fill these holes in a plausible way using texture synthesis methods, but they will not correspond to the true background.

The depth map tends to be particularly inaccurate along silhouettes and will lead to many flickering artifacts.

Humans are very sensitive to faces, so small errors in the geometry could lead to distortions that may be small in a geometric sense but very large in a perceptual sense.

Gaze correction is a very important issue for teleconferencing and many experimental and commercial systems support it [Jones et al. 2009; Nguyen and Canny 2005; Gross et al. 2003; Okada et al. 1994]. However, these systems often use expensive custom-made hardware devices that are not suitable for mainstream home use. Conceptually, the gaze correction problem is closely related to the real-time novel-view synthesis problem [Matusik et al. 2000; Matusik and Pfister 2004; Zitnick et al. 2004; Petit et al. 2010; Kuster et al. 2011]. Indeed if a scene could be rendered from an arbitrary viewpoint then a virtual camera could be placed along the line of sight of the subject and this would achieve eye contact. Novel view synthesis using simple video cameras has been studied for the last 15 years, but unless a large number of video cameras are used, it is difficult to obtain high-quality results. Such setups are not suitable for our application model that targets real-time processing and inexpensive hardware.

There are several techniques designed specifically for gaze correction that are more suitable for an inexpensive setup. Some systems only require two cameras [Criminisi et al. 2003; Yang and Zhang 2002] to synthesize a gaze-corrected image of the face. They accomplish this by performing a smart blending of the two images. This setup constrains the position of the virtual camera to the path between the two real cameras. More importantly, the setup requires careful calibration and is sensitive to light conditions, which makes it impractical for mainstream use.

Several methods use only one color camera to perform gaze correction. Some of these [Cham et al. 2002] work purely in image space, trying to find an optimal warp of the image, and are able to obtain reasonable results only for very small corrections. This is because without some prior knowledge about the shape of the face it is difficult to synthesize a convincing image. Thus other methods use a proxy geometry to synthesize the gaze-corrected image. Yip et al. [2003] uses an elliptical model for the head and Gemmell [2000] uses an ad-hoc model based on the face features. However, templates are static and faces are dynamic. So a single static template will typically fail to do a good job when confronted with a large variety of different facial expressions.

Since the main focus of many of these methods is reconstructing the underlying geometry of the head or face, the emergence of consumer-level depth/color sensors such as the Kinect, giving easy access to real-time geometry and color information, is an important technological breakthrough that can be harnessed to solve the problem. Zhu et al. [2011] proposed a setup containing one depth camera and three color cameras and combined the depth map with a stereo reconstruction from the color cameras. However this setup only reconstructs the foreground image and still is not inexpensive.

DETAILED DESCRIPTION

Overview

Figure 1:
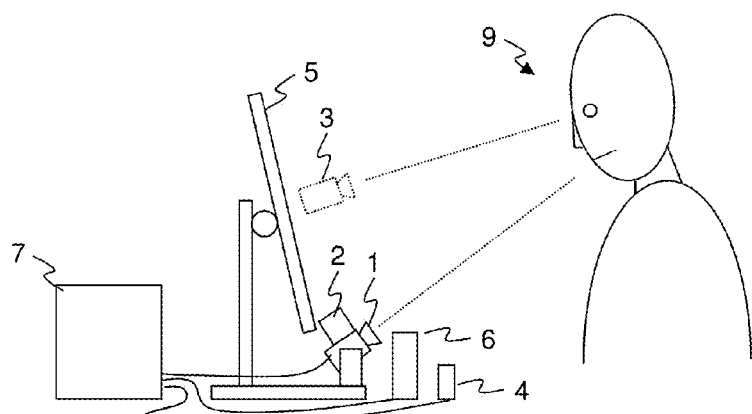
FIG. 1 shows one embodiment of a setup of the system's user interface hardware.

It is therefore an object of the invention to create a method and system for image processing in video conferencing of the type mentioned initially, which overcomes the disadvantages mentioned above.

These objects are achieved by a method and system for image processing in video conferencing according to the corresponding independent claims.

The method for image processing in video conferencing, for correcting the gaze of a human interlocutor (or user) in an image or a sequence of images captured by at least one real camera, comprises the steps of the at least one real camera acquiring an original image of the interlocutor;

synthesizing, that is, computing a corrected or novel view of the interlocutor's face as seen by a virtual camera, the virtual camera being located on the interlocutor's line of sight and oriented towards the interlocutor (in particular along the line of sight);

transferring the corrected view of the interlocutor's face from the synthesized view into the original image, thereby generating a final image;

at least one of displaying the final image and transmitting the final image, typically over a data communication network for display at another user's computer.

The gaze correction system is targeted at a peer-to-peer video conferencing model that runs in real-time on average consumer hardware and, in one embodiment, requires only one hybrid depth/color sensor such as the Kinect. One goal is to perform gaze correction without damaging the integrity of the image (i.e., loss of information or visual artifacts) while completely preserving the facial expression of the person or interlocutor. A main component of the system is a face replacement algorithm that synthesizes a novel view of the subject's face in which the gaze is correct and seamlessly transfers it into the original color image. This results in an image with no missing pixels or significant visual artifacts in which the subject makes eye contact. In the synthesized image there is no loss of information, the facial expression is preserved as in the original image and the background is also maintained. In general, transferring the image of the face from the corrected image to the original may lead to an inconsistency between the vertical parallax of the face and the rest of the body. For large rotations this might lead to perspective aberrations if, for example, the face is looking straight and the head is rotated up. A key observation is that in general conferencing applications the transformation required for correcting the gaze is small and it is sufficient to just transform the face, as opposed to the entire body.

In the remainder of the text, the gaze correction system and method shall be explained in terms of a system using only one real video camera (i.e., a color or black and white image camera) in addition to the depth map. It is straightforward to extend the system and method to employ multiple cameras.

In an embodiment, the method comprises the step of acquiring, for each original image, typically at the same time, an associated depth map comprising the face of the interlocutor, and wherein the step of synthesizing the corrected view of the interlocutor's face comprises mapping the original image onto a 3D model of the interlocutor's face based on the depth map, and rendering the 3D model from a virtual camera placed along an estimate the interlocutor's line of sight. If more than one camera is available, their respective images can be blended on the 3D model.

Alternatively, in an embodiment, it is also possible to estimate a 3D face model from one or more images alone, for example by adapting a generic 3D model to the facial features recognized in the image. Also, a generic 3D face model can be used without adapting it to the image.

The gaze correction approach can be based on a depth map acquired with a single depth scanner such as a Microsoft Kinect sensor, and preserves both the integrity and expressiveness of the face as well as the fidelity of the scene as a whole, producing nearly artifact-free imagery. The method is suitable for mainstream home video conferencing: it uses inexpensive consumer hardware, achieves real-time performance and requires just a simple and short setup. The approach is based on the observation that for such an application it is sufficient to synthesize only the corrected face. Thus, we render a gaze-corrected 3D model of the scene and, with the aid of a face tracker, transfer the gaze-corrected facial portion in a seamless manner onto the original image.

In an embodiment, the step of transferring the corrected view of the interlocutor's face from the synthesized view into the original image comprises determining an optimal seam line between the corrected view and the original image that minimizes a sum of differences between the corrected view and the original image along the seam line. In an embodiment, the differences are intensity differences. The intensity considered here can be the grey value or gray level, or a combination of intensity differences from different color channels.

In an embodiment, determining the optimal seam line comprises starting with either:
- an ellipsoidal polygon fitted to chin points determined by a face tracker; or
- with a polygon determined for a previous image of a sequence of images and adapting vertex points of the polygon in order to minimize the sum of differences.

In an embodiment, only vertices of an upper part of the polygon, in particular of an upper half of the polygon, corresponding to an upper part of the interlocutor's face, are adapted.

In an embodiment, the method comprises the step of temporal smoothing of the 3D position of face tracking vertices over a sequence of depth maps by estimating the 3D position of the interlocutor's head in each depth map and combining the 3D position of the vertices as observed in a current depth map with a prediction of their position computed from their position in at least one preceding depth map and from the change in the head's 3D position and orientation, in particular: from the preceding depth map to the current depth map.

In an embodiment, the method comprises the steps of, in a calibration phase, determining transformation parameters for a geometrical transform relating the position and orientation of the real camera and the virtual camera by displaying the final image to the interlocutor and accepting user input from the interlocutor to adapt the transformation parameters until the final image is satisfactory. This can be done by the interlocutor entering a corresponding user input such as clicking on an "OK" button in a graphical user interface element displayed on the screen.

In an embodiment, the method comprises the steps of, in a calibration phase, determining transformation parameters for a geometrical transform relating the position and orientation of the real camera and the virtual camera by:
- acquiring a first depth map of at least the interlocutor's face when the interlocutor is looking at the real camera;
- acquiring a second depth map of at least the interlocutor's face when the interlocutor is looking at a display screen that is placed to display an image of an interlocutor's conference partner; and
- computing the transformation parameters from a transform that relates the first and second depth maps.

In an embodiment, the method comprises the steps of, in a calibration phase, adapting a 2D translation vector for positioning the corrected view of the interlocutor's face in the original image by displaying the final image to the interlocutor and accepting user input from the interlocutor to adapt the 2D translation vector until the final image is satisfactory. In a variant of this embodiment, adapting the 2D translation vector is done in the same step as determining the transformation parameters mentioned above.

In an embodiment, the method comprises the steps of identifying the 3D location of the interlocutor's eyeballs using a face tracker, approximating the shape of the eyeballs by a sphere and using, in the depth map at the location of the eyes, this approximation in place of the acquired depth map information.

In an embodiment, the method comprises the step of smoothing the depth map comprising the face of the interlocutor, in particular by Laplacian smoothing.

In an embodiment, the method comprises the step of artificially extending the depth map comprising the face of the interlocutor. In addition or alternatively, the step of filling holes within the depth map can be performed.

According to one aspect of the invention, the image and geometry processing method serves to correct the gaze of an interlocutor recorded, requires only one (depth and color) camera, where the interlocutor's line of sight is not aligned with that camera, and comprises the following steps:
a. localizing the perimeter of the head of the interlocutor by using an appropriate algorithm; and
b. generating a novel view by applying a transformation to the image inside the identified perimeter so that the line of sight aligns with the camera, while leaving the image outside of the identified perimeter of the head essentially unchanged.

In an embodiment of this image and geometry processing method according to this aspect, smoothing is applied to the depth map, preferably Laplacian smoothing.

In an embodiment of this image and geometry processing method according to this aspect, the geometry around the identified perimeter through the discontinuities in the depth map is artificially enlarged to take into account the low resolution of the depth map.

In an embodiment of this image and geometry processing method according to this aspect, the transformed image inside the identified perimeter is pasted back onto the original image along an optimized seam that has as little changes as possible when comparing the transformed image with the original image.

In an embodiment of this image and geometry processing method according to this aspect, the method in addition comprises a calibration step to set up the transformation that needs to be carried out to the image inside the identified perimeter, defining the relative position of the line of sight with respect to the camera.

In an embodiment, a computer program or a computer program product for image processing in video conferencing is loadable into an internal memory of a digital computer or a computer system, and comprises computer-executable instructions to cause one or more processors of the computer or computer system execute the method for image processing in video conferencing. In another embodiment, the computer program product comprises a computer readable medium having the computer-executable instructions recorded thereon. The computer readable medium preferably is non-transitory; that is, tangible. In still another embodiment, the computer program is embodied as a reproducible computer-readable signal, and thus can be transmitted in the form of such a signal.

A method of manufacturing a non-transitory computer readable medium comprises the step of storing, on the computer readable medium, computer-executable instructions which, when executed by a processor of a computing system, cause the computing system to perform the method steps for image processing in video conferencing as described in the present document.

Further embodiments are evident from the dependent patent claims. Features of the method claims may be combined with features of the device claims and vice versa.

DETAILED DESCRIPTION WITH DRAWINGS

The system and method described below represent possible embodiments of the claimed invention. They can be realized by using a real camera 1 combined with a depth scanner 2, as shown in a schematic fashion in FIG. 1. Further elements of a videoconferencing system comprise a microphone 4, a display 5, and a loudspeaker 6, all typically connected to a general-purpose computer 7 or dedicated video conferencing device comprising a data processing unit and programmed to perform the method as described herein. A combination of such elements and in particular of a camera and a depth scanner is embodied, for example, in a Microsoft Kinect device capable of acquiring a hybrid depth/color image, wherein the color image, in this context the "original image" 10 is obtained using a regular camera and a depth map 13 is obtained from reflection patterns of a structured infrared image. In general, the color and depth information can be retrieved by any other adequate way. Instead of a color image 10, a black and white image 10 can be used just as well.

Figure 2:
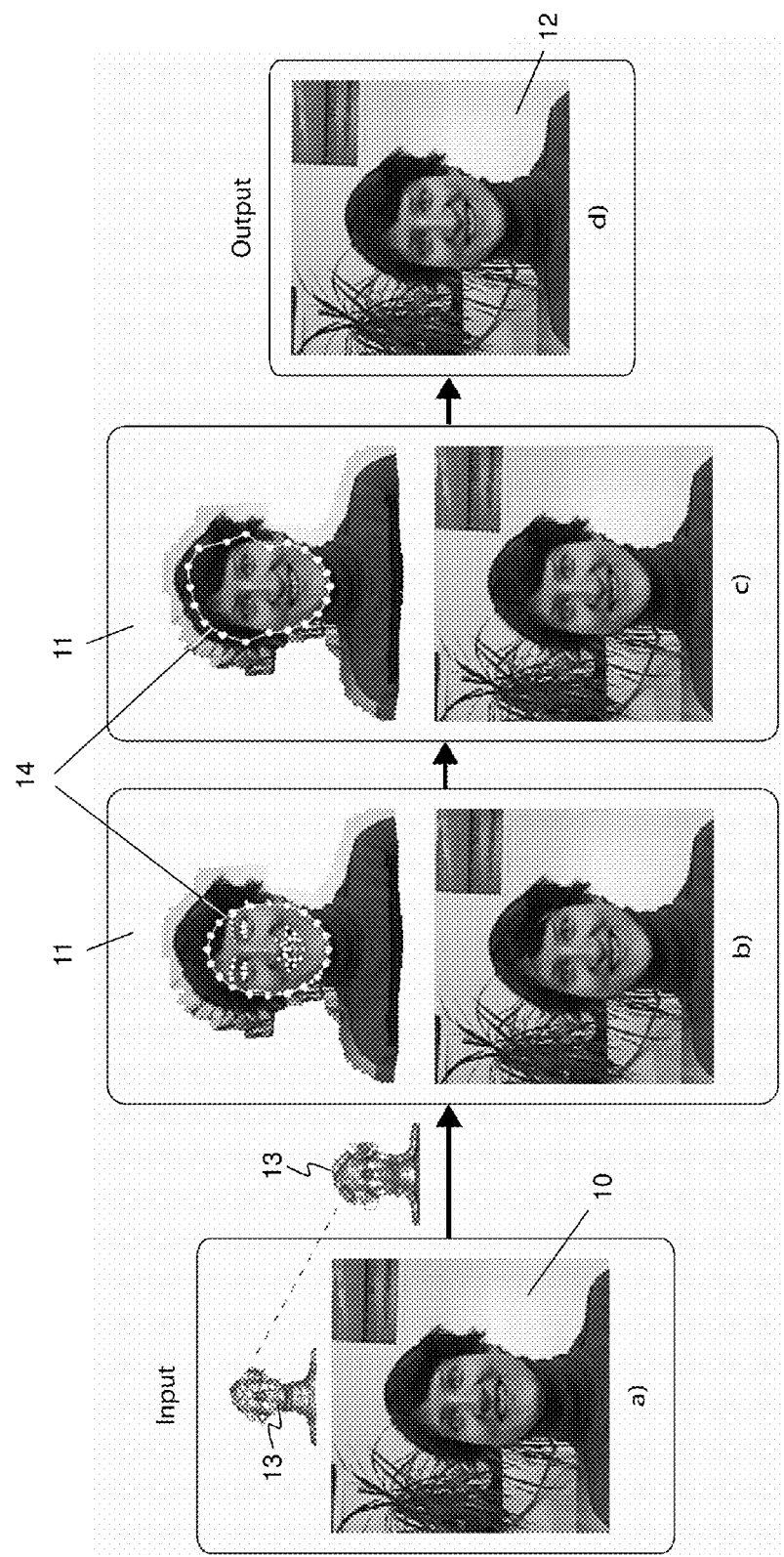
FIG. 2 shows one embodiment of images as they are processed and combined by the system.

In an embodiment, only device required is a single hybrid depth/color sensor such as the Kinect. Although webcams are usually mounted on the top of the screen, the current hybrid sensor devices are typically quite bulky and it is more natural to place them at the bottom of the screen. As shown in an exemplary manner in FIG. 1, the setup comprises a single Kinect device comprising both a real camera 1 and a depth scanner 2 viewing a person 9 or subject or interlocutor in a video conference. The angle between the Kinect and the screen window 5 is typically between 19 and 25 degrees. The gaze correction system first synthesizes a novel view where the subject 9 makes eye contact using the geometry from the depth camera (FIG. 2*b*). The resulting image has holes and artifacts around the silhouettes due to occlusions and depth errors. To construct a complete image that preserves both the integrity of the background and foreground, the facial expression of the subject 9 as well as the eye contact, we transfer only the face from the synthesized view seamlessly into the original image 10. This allows to completely preserve both the spatial and temporal integrity of the image without any loss of information and achieve eye contact while simultaneously preserving the facial expression of the subject 9.

System Overview:
  a) Input: color and depth images from the Kinect.
  b) Synthesize an image of the subject with the gaze corrected (by performing an appropriate 3D transformation of the head geometry).
    Top: The subject overlayed with the face tracker (small dots around eyes, nose, mouth and chin) and a seam line 14 in the shape of an ellipse fitted to the chin points of the face tracker (large dots).
    Bottom: Use the ellipse as a stencil to copy the gaze-corrected rendering and paste it into the original image 10. Seam artifacts are visible.
  c) Optimize the seam line 14.
    Top: The subject overlayed with the new seam line 14 (large dots). Much fewer visible artifacts.
  d) Blend the images along the seam line defined by edges linking the vertices to obtain the final result.

The steps of the algorithm are as follows:
1. Smooth and fill holes on the Kinect depth map 13 (FIG. 2*a*) using Laplacian smoothing. In practice, to improve performance, we do this only on the foreground objects that are obtained using a simple depth threshold. Moreover, the silhouette from the Kinect is very inaccurate and it is possible that chunks of the face geometry can be missing, especially at the edges around the face. Therefore, we extend the geometry artificially by around 25 pixels and/or fill any holes (i.e., points without depth information) in the depth map.
2. Generate a novel view or corrected view 11 where the gaze is corrected (FIG. 2*b*, top). This is accomplished by applying a transformation to the geometry to place the subject in the coordinate frame of the virtual camera 3, oriented so as to look at the virtual camera 3; i.e., with the interlocutor's line of sight directed towards the virtual camera 3. The parameters of this transformation are computed only once during the calibration stage. The face now has correct gaze, but the image is no longer complete and consistent. The line of sight is determined by the 3D head position detection, for example, as a line orthogonal to the head; i.e., in the direction of the head orientation; and passing through one of the eyes or through a point in the middle between the two eyes.
3. Extract the face from the corrected image 11 and seamlessly transfer it into the original image 10 (FIG. 2*b*, bottom). We use a state-of-the-art face tracker [Saragih et al. 2011] to track facial feature points in the original color image. The tracker computes; e.g., 66 feature points along the chin, nose, eyes, and eyebrows (see also FIG. 6). We compute an optimal stencil or seam line 14 to cut the face from the transformed; i.e., corrected image (FIG. 2*c*, top and bottom). The optimal stencil preferably ensures the spatial consistency of the image as well as the temporal consistency of the sequence. The face; that is, a segment 15 of the corrected image; is transferred by blending the two images on a narrow 5-10 pixel wide band along the boundary (FIG. 2*d*).

Extending the geometry artificially and/or filling any holes in the depth map can be done with the following steps:
  select a kernel; i.e., a window, for example of size K=25; and
  for each pixel of unknown depth, position the kernel such that its center is at this pixel and compute the average value of the known depth values inside this kernel (if no known values, then skip; i.e., ignore pixels that have no known depth value) and assign this value to the studied center pixel.

This will fill the holes whose size is smaller than K. The sequence of pixels being processed typically starts with pixels that lie next to pixels of known depth.

Figure 3:
FIG. 3 shows one embodiment of a comparison of different approaches.
Figure 4:
FIG. 4 shows examples of images generated by an embodiment of the system.

A key observation is that in general conferencing applications the transformation required for correcting the gaze is small and it is sufficient to just transform the face, as opposed to the entire body. FIG. 3 illustrates this observation. The left column shows original images 10 of two different subjects where the gaze is away from the camera. In the middle column their gaze is corrected by just rotating the geometry, giving corrected views 11. The right column shows the results; i.e., the final images 12. Transferring the rotated face onto the original image 10 does not lead to perspective aberrations. Please note that the appearance of the person 9 is similar to just transforming the entire geometry with the advantage that we can preserve the integrity of the scene. FIG. 4 shows further examples of the application of the system or method, with the original images 10 in the top row and final images 12 (or output images) with corrected gaze in the bottom row.

Initial Calibration

A few parameters of the system depend on the specific configuration and face characteristics that are unique to any given user. For instance, the position of the virtual camera 3 depends on the location of the videoconferencing application window on the display screen 5 as well as the height of the person 9 and the location of the depth sensor 2. These parameters are set by the user only once at the beginning of a session using a simple and intuitive interface. The calibration process typically takes less than 30 seconds. After that the system runs in a fully automatic way.

The first parameter that needs to be set is the position of the virtual camera 3. This is equivalent to finding a rigid transformation that, when applied to the geometry, results in an image that makes eye contact. We provide two mechanisms for that. In the first one, we allow the user, using a trackball-like interface, to find the optimal transformation by him/herself. We provide visual feedback by rendering the corrected geometry onto the window where the user is looking. This way, the user 9 has complete control over the point at which to make eye contact. The second one is a semi-automatic technique where two snapshots are taken from the Kinect's camera 1: one while the user is looking straight at the Kinect's camera 1 and one while the user is looking straight at the video conference window on the display 5. From these two depth images we can compute the rigid transformation that maps one into the other. This can be accomplished by matching the eye-tracker points in the two corresponding color/depth images.

Figure 5:
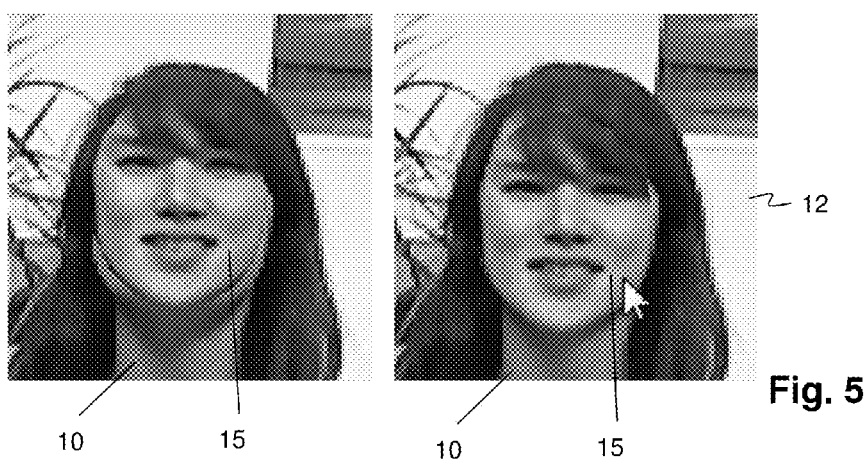
FIG. 5 shows one implementation of a 2D offset correction.

When rigidly pasting the face from the gaze corrected image onto the original image 10, we still have two degrees of freedom: a 2D translation vector that positions the corrected face in the original image 10. Thus, a second parameter that requires an initial setting is the pasted face offset. The simplest way to determine this parameter is to automatically align the facial features (FIG. 5 left) such that the eye and mouth positions will roughly coincide. Unfortunately, this does not lead to appealing results because the proportions of the face are still unnatural. For example, the forehead will look unnaturally shrunk. This is because in reality when we rotate the head, the face features, such as the eyes and the mouth, are moved lower in a perspective transformation. By slightly moving the decal down (FIG. 5 right) the proportions of the face can be restored. The same problem does not appear along the chin because the chin belongs to the actual silhouette of the face where there is a depth discontinuity from both the real camera and from the virtual camera 3. The user can drag the decal of the face, that is, the segment 15 of the corrected image that is transferred to the original image 11, in one frame downward until the proportions look natural. This offset can then be used throughout the process.

Seam Optimization

In order to transfer the face from the corrected view 11 to the original image 10, a seam that minimizes the visual artifacts has to be found in every frame. To accomplish this we compute a polygonal seam line 14 or seam S that is as similar as possible in the source image and the corrected image. When blended together, the seam will appear smooth. We minimize the following energy, similar to [Dale et al. 2011]:

$$E_{TOTAL} = \Sigma E(p_i) \forall p_i \in S \quad (1)$$

where $E(p) = \Sigma \|I_s(q_s) - I_o(q_i)\|_2^2 \forall q_i \in B(p)$ where $I_o$ and $I_s$ are the pixel intensities in the original and synthesized images and B(p) is a 5×5 block of pixels around p. The pixel intensities are, for example, grey values or a combination of color intensities.

Due to performance constraints, a local optimization technique can be chosen. While this does not lead to a globally optimal solution, the experiments show that it typically leads to a solution without visible artifacts. First, an ellipse is fitted to the chin points of the face tracker and offset according to the calibration (FIG. 2b). Each vertex on the upper half of the ellipse is iteratively optimized by moving it along the ray connecting the vertex to the ellipse center. We construct ellipses that have 20 to 30 points in total and the scheme converges in about four iterations. This procedure is very efficient because each vertex moves only in one dimension (the final solution will always be a simple star-shaped polygon), yet results in an artifact-free seam line 14. We optimize only the top half of the ellipse because, unlike the forehead, the chin seam corresponds to a true depth discontinuity on the face. Therefore, we expect to see a discontinuity that makes the chin distinctive. Imposing a smooth seam along the chin will lead to unnatural visual artifacts. To further speed up the process, the optimization takes advantage of temporal coherence, and in each frame starts with the polygon from the previous frame as an initial guess.

Eye Geometry Correction

One important challenge in synthesizing human faces stems from the fact that human perception is very sensitive to faces, especially the eyes. Relatively small changes in the geometry of the face can lead to large perceptual distortions.

The geometry from the depth sensor is very coarse and as a result artifacts can appear. The most sensitive part of the face is near the eyes where the geometry is unreliable due to the reflectance properties of the eyeballs. Therefore, the eyes may look unnatural. Fortunately, the eyes are a feature with relatively little geometric variation from person to person, and can be approximated well by a sphere having a radius of approximately 2.5 cm. They can be added artificially to the depth map 13, replacing the depth values provided by the depth sensor, by identifying the eyes position using the face tracker.

Temporal Stabilization

Figure 6:
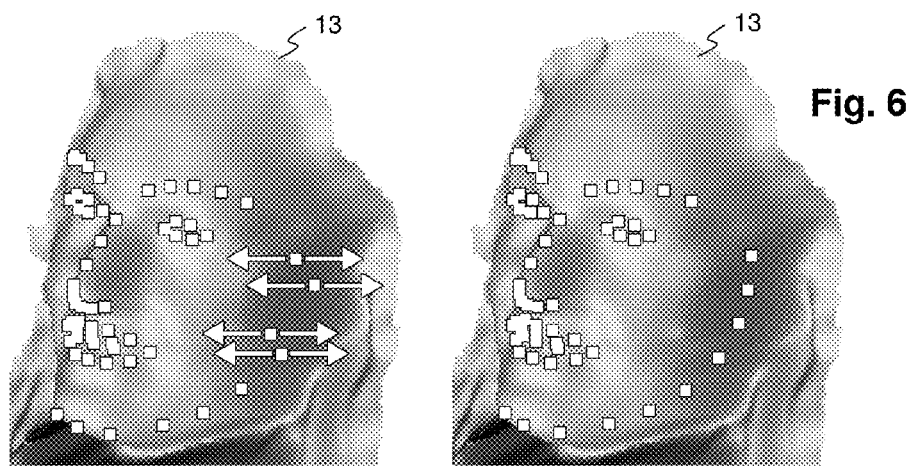
FIG. 6 shows an example correction of z-values at the boundary of pasted image segments.

Large temporal discontinuities from the Kinect or depth map geometry can lead to disturbing flickering artifacts. Although the 2D face tracking points (facial feature points) are fairly stable in the original color image, when projected onto the geometry, their 3D positions are unreliable, particularly near depth discontinuities such as the silhouettes. FIG. 6 shows 3D positions of the tracked facial feature points. Left: without stabilization. The points near depth discontinuities—from the perspective of the camera—can slide arbitrarily along the z-direction; i.e., respective projective rays of the camera, depicted as arrows. As this error is most predominant in the z-direction of the initial view, we fix the problem by optimizing the face tracker vertices along the respective projective rays. A naïve averaging of the z-values (in the camera coordinate system) over several frames would stabilize the stencil, but would create strobing artifacts when the person 9 moves back and forth. Instead, we first estimate the translational 3D motion of the head using the tracked points around the eyes. These points are more reliable because they are not located near a depth discontinuity. Using this information we perform temporal smoothing of the 3D face tracking vertices by averaging the z-values over several frames, subtracting the global translation between frames. The resulting corrected facial feature points are seen in FIG. 6, right. This stabilization technique comes at nearly no penalty in computing resources and successfully provides a temporally consistent gaze correction even when the subject performs a wide range of motions.

Results and Discussion

To demonstrate and validate the system we ran it on 36 subjects. We calibrated the system for each user and let the user talk in a video conference setup for a minute. Depending on the subject, the rotation of the transformation applied for the geometry varies from 19 to 25 degrees. The calibration process is very short (i.e., around 30 seconds) and the results are convincing for a variety of face types, hair-styles, ethnicities, etc. The expressiveness of the subject is preserved, in terms of both facial expression and gestures. This is crucial in video-conferencing since the meaning of non-verbal communication must not be altered. The system can rectify the gaze of two persons simultaneously. This is done by dividing the window and applying the method to each face individually. The system is robust against lighting conditions (dimmed light and overexposure) and illumination changes. This would cause problems for a stereo-based method. The method is robust to appearance changes. When the subjects pull their hair back or change their hair style, the gaze is still correctly preserved and the dynamic seam does not show any artifacts.

The system runs at about 20 Hz on a consumer computer. The convincing results obtained with the method and the simplicity of use motivated the development of a Skype plugin. Users can download it from the authors' website and install it on their own computer in a few clicks. The plugin seamlessly integrates in Skype and is very intuitive to use: a simple on/off button enables/disables the algorithm. The plugin brings real-time and automatic gaze correction to the millions of Skype users all over the world.

Limitations:

When the face of the subject is mostly occluded, the tracker tends to fail [Saragih et al. 2011]. This can be detected automatically and the original footage from the camera 1 is displayed. Although the system is robust to many accessories that a person 9 might wear, reflective surfaces like glasses cannot be well reconstructed resulting in visual artifacts. Since the method performs a multi-perspective rendering, the face proportions might be altered especially when the rotation is large.

CONCLUSION

The system accomplishes two important goals in the context of video-conferencing. First and foremost, it corrects the gaze in a convincing manner while maintaining the integrity and the information of the image for both foreground and background objects, leading to artifact-free results in terms of visual appearance and communication. Second, the calibration is short and trivial and the method uses inexpensive and available equipment that will be as ubiquitous as the webcam in the near future. Given the quality of the results and its simplicity of use, the system is ideal for home video-conferencing. Finally, the intuitive Skype plugin brings gaze correction to the mainstream and consumer level.

While the invention has been described in present embodiments, it is distinctly understood that the invention is not limited thereto, but may be otherwise variously embodied and practised within the scope of the claims.

REFERENCES

ARGYLE, M., AND COOK, M. 1976. Gaze and mutual gaze. Cambridge University Press.
CHAM, T.-J., KRISHNAMOORTHY, S., AND JONES, M. 2002. Analogous view transfer for gaze correction in video sequences. In ICARCV, vol. 3, 1415-1420.
CHEN, M. 2002. Leveraging the asymmetric sensitivity of eye contact for videoconference. In CHI, 49-56.
CRIMINISI, A., SHOTTON, J., BLAKE, A., AND TORR, P. H. S. 2003. Gaze manipulation for one-to-one teleconferencing. In ICCV, 191-198.
DALE, K., SUNKAVALLI, K., JOHNSON, M. K., VLASIC, D., MATUSIK, W., AND PFISTER, H. 2011. Video face replacement. In SIGGRAPH Asia, 1-10.
GEMMELL, J., TOYAMA, K., ZITNICK, C. L., KANG, T., AND SEITZ, S. 2000. Gaze awareness for video-conferencing: A software approach. IEEE MultiMedia 7, 26-35.
GRAYSON, D. M., AND MONK, A. F. 2003. Are you looking at me? eye contact and desktop video conferencing. ACM Trans. Comput.-Hum. Interact. 10, 221-243.
GROSS, M., WURMLIN, S., NAEF, M., LAMBORAY, E., SPAGNO, C., KUNZ, A., KOLLER-MEIER, E., SVOBODA, T., VAN GOOL, L., LANG, S., STREHLKE, K., MOERE, A. V., AND STAADT, O. 2003. Blue-c: a spatially immersive display and 3D video portal for telepresence. In SIGGRAPH, 819-827.
ISHII, H., AND KOBAYASHI, M. 1992. Clearboard: a seamless medium for shared drawing and conversation with eye contact. In CHI, 525-532.
JONES, A., LANG, M., FYFFE, G., YU, X., BUSCH, J., MCDOWALL, I., BOLAS, M., AND DEBEVEC, P. 2009. Achieving eye contact in a one-to-many 3D video teleconferencing system. In SIGGRAPH, 64:1-64:8.
KUSTER, C., POPA, T., ZACH, C., GOTSMAN, C., AND GROSS, M. 2011. FreeCam: a hybrid camera system for interactive free viewpoint video. In VMV, 17-24.
MACRAE, C. N., HOOD, B., MILNE, A. B., ROWE, A. C., AND MASON, M. F. 2002. Are you looking at me? eye gaze and person perception. In Psychological Science, 460-464.
MATUSIK, W., AND PFISTER, H. 2004. 3D TV: a scalable system for real-time acquisition, transmission, and autostereoscopic display of dynamic scenes. In SIGGRAPH, 814-824.
MATUSIK, W., BUEHLER, C., RASKAR, R., GORTLER, S. J., AND MCMILLAN, L. 2000. Image-based visual hulls. In SIGGRAPH, 369-374.
MICROSOFT, 2010. http://www.xbox.com/en-US/kinect.
MONK, A. F., AND GALE, C. 2002. A look is worth a thousand words: Full gaze awareness in video-mediated conversation. Discourse Processes 33, 3, 257-278.
MUKAWA, N., OKA, T., ARAI, K., AND YUASA, M. 2005. What is connected by mutual gaze?: user's behavior in video-mediated communication. In CHI, 1677-1680.
NGUYEN, D., AND CANNY, J. 2005. Multiview: spatially faithful group video conferencing. In CHI, 799-808.
OKADA, K.-I., MAEDA, F., ICHIKAWAA, Y., AND MATSUSHITA, Y. 1994. Multiparty videoconferencing at virtual social distance: Majic design. In Proc. Conference on Computer supported cooperative work (CSW), 385-393.
PETIT, B., LESAGE, J.-D., MENIER, C., ALLARD, J., FRANCO, J.-S., RAFFIN, B., BOYER, E., AND FAURE, F. 2010. Multicamera real-time 3D modeling for telepresence and remote collaboration. Intern. Journ. of Digital Multi. Broadcasting.
SARAGIH, J., LUCEY, S., AND COHN, J. 2011. Deformable model fitting by regularized landmark mean-shift. IJCV 91, 200-215.
STOKES, R. 1969. Human factors and appearance design considerations of the mod II picturephone station set. IEEE Transactions on Communication Technology 17, 2, 318-323.
YANG, R., AND ZHANG, Z. 2002. Eye gaze correction with stereovision for video-teleconferencing. In ECCV, 479-494.
YIP, B., AND JIN, J. S. 2003. Face re-orientation in video conference using ellipsoid model. In OZCHI, 167-173.

ZHU, J., YANG, R., AND XIANG, X. 2011. Eye contact in video conference via fusion of time-of-flight depth sensor and stereo. 3D Research 2, 1-10.

ZITNICK, C. L., KANG, S. B., UYTTENDAELE, M., WINDER, S., AND SZELISKI, R. 2004. High-quality video view interpolation using a layered representation. SIGGRAPH 23, 600-608.

What is claimed is:

1. A method for image processing in video conferencing, for correcting the gaze of an interlocutor in an image or a sequence of images captured by at least one real camera, comprising the steps of:

the at least one real camera acquiring an original image of the interlocutor and localizing the perimeter of the face of the interlocutor;

synthesizing a corrected view of only the interlocutor's face, as seen by a virtual camera, the virtual camera being located on the interlocutor's line of sight and oriented towards the interlocutor;

transferring the corrected view of only the interlocutor's face from the synthesized view into the original image by determining a seam line between the corrected view and the original image, for cutting the interlocutor's face from the corrected image along the seam line, and blending the corrected view and the original image along a seam line, thereby generating a final image, while leaving the image outside of the identified perimeter of the interlocutor's face unchanged for purposes of interlocutor-gaze correction; and at least one of displaying the final image and transmitting the final image.

2. The method of claim 1, wherein the step of synthesizing the corrected view of the interlocutor's face comprises mapping the original image onto a 3D model of the interlocutor's face, and rendering the 3D model from a virtual camera placed along an estimate of the interlocutor's line of sight.

3. The method of claim 1 or claim 2, wherein the step of transferring the corrected view of the interlocutor's face from the synthesized view into the original image comprises determining the seam line as an optimal seam.

4. The method of claim 1, comprising the steps of, in a calibration phase, determining transformation parameters for a geometrical transform relating the position and orientation of the real camera and the virtual camera by:

displaying the final image to the interlocutor; and
accepting user input from the interlocutor to adapt the transformation parameters until the final image is satisfactory.

5. The method of claim 1, comprising the steps of, in a calibration phase, determining transformation parameters for a geometrical transform relating the position and orientation of the real camera and the virtual camera by:

acquiring a first depth map of at least the interlocutor's face when the interlocutor is looking at the real camera;
acquiring a second depth map of at least the interlocutor's face when the interlocutor is looking at a display screen that is placed to display an image of an interlocutor's conference partner; and
computing the transformation parameters from a transform that relates the first and second depth maps.

6. The method of claim 1, comprising the steps of, in a calibration phase, adapting a 2D translation vector for positioning the corrected view of the interlocutor's face in the original image by:

displaying the final image to the interlocutor; and
accepting user input from the interlocutor to adapt the (2D) translation vector until the final image is satisfactory.

7. The method of claim 2, comprising the step of estimating the 3D model of the interlocutor's face by adapting a generic 3D model to facial features recognized in one or more original images.

8. The method of claim 2, comprising the step of using a generic 3D model of the interlocutor's face without adapting it to one or more original images.

9. The method of claim 2, comprising the steps of:
acquiring, for each original image, an associated depth map comprising the face of the interlocutor; and
determining the 3D model of the interlocutor's face based on the depth map.

10. The method of claim 9, comprising the step of temporal smoothing of the 3D position of face tracking vertices over a sequence of depth maps by:
estimating the 3D position of the interlocutor's head in each depth map; and
combining the 3D position of the vertices as observed in a current depth map with a prediction of their position computed from their position in at least one preceding depth map and from the change in the head's 3D position and orientation.

11. The method of claim 9, comprising the steps of:
identifying the 3D location of the interlocutor's eyeballs using a face tracker;
approximating the shape of the eyeballs by a sphere; and
using, in the depth map at the location of the eyes, this approximation in place of the acquired depth map information.

12. The method of claim 9, comprising the step of smoothing the depth map comprising the face of the interlocutor.

13. The method of claim 12, wherein said smoothing of the depth map uses Laplacian smoothing.

14. The method of claim 9, comprising one or both of the steps of:
artificially extending the depth map comprising the face of the interlocutor at its boundaries; and
filling holes within the depth map.

15. A data processing system for image processing in video conferencing, for correcting the gaze of an interlocutor in an image or a sequence of images captured by at least one real camera, comprising at least one real camera for acquiring an image of the interlocutor, the system being programmed to execute the method according to claim 1.

16. A non-transitory, computer-readable medium comprising computer-readable program code encoding a computer program that, when loaded and executed on a computer, causes the computer to execute the method according to claim 1.

17. The method of claim 3, wherein the optimal seam is a seam line between the corrected view and the original image that minimizes a sum of differences between the corrected view and the original image along the seam line.

18. The method of claim 17, wherein determining the optimal seam line comprises the steps of:
starting with either:
an ellipsoidal polygon fitted to chin points determined by a face tracker, or
with a polygon determined for a previous image of a sequence of images; and
adapting vertex points of the polygon in order to minimize the sum of differences.

19. The method of claim 18, wherein said step of adapting vertex points is limited to only vertices of an upper part of the polygon, corresponding to the upper portion of the interlocutor's face above said chin points.

* * * * *